US009840126B2

(12) United States Patent
Kanemaru et al.

(10) Patent No.: US 9,840,126 B2
(45) Date of Patent: Dec. 12, 2017

(54) METHOD AND APPARATUS FOR OPERATING A VEHICLE HVAC SYSTEM TO PREVENT OUTPUT OF INVERSE AIRFLOW

(75) Inventors: Junichi Kanemaru, Columbus, OH (US); Shinji Kakizaki, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 1979 days.

(21) Appl. No.: 13/030,465

(22) Filed: Feb. 18, 2011

(65) Prior Publication Data
US 2012/0214392 A1 Aug. 23, 2012

(51) Int. Cl.
*F24F 7/00* (2006.01)
*B60H 1/00* (2006.01)

(52) U.S. Cl.
CPC ... *B60H 1/00028* (2013.01); *B60H 2001/002* (2013.01); *B60H 2001/00099* (2013.01); *B60H 2001/00121* (2013.01); *B60H 2001/00135* (2013.01); *B60H 2001/00164* (2013.01)

(58) Field of Classification Search
USPC .......................................................... 236/49.3
See application file for complete search history.

(56) References Cited

U.S. PATENT DOCUMENTS

| 4,842,047 | A | 6/1989 | Sakurada et al. |
| 4,962,302 | A * | 10/1990 | Katsumi ........................ 236/13 |
| 5,299,631 | A | 4/1994 | Dauvergne |
| 5,413,528 | A | 5/1995 | Pabst et al. |
| 5,699,960 | A | 12/1997 | Kato et al. |
| 6,422,309 | B2 | 7/2002 | Vincent |
| 6,470,960 | B2 | 10/2002 | Kampf et al. |
| 6,598,665 | B2 | 7/2003 | Schwarz |
| 6,912,861 | B2 * | 7/2005 | Imoto .............................. 62/179 |
| 6,945,060 | B2 * | 9/2005 | Tomita et al. .................. 62/157 |
| 2004/0098995 | A1 * | 5/2004 | Ito et al. ......................... 62/186 |
| 2005/0230489 | A1 | 10/2005 | Demirdjian et al. |
| 2006/0118290 | A1 * | 6/2006 | Klassen et al. ............... 165/202 |

(Continued)

FOREIGN PATENT DOCUMENTS

JP H06206423 A * 7/1994 ............... B60H 1/00
JP 08020216 1/1996

OTHER PUBLICATIONS

International Search Report and Written Opinion of PCT/US2012/020060 dated May 1, 2012.

(Continued)

*Primary Examiner* — Larry Furdge
(74) *Attorney, Agent, or Firm* — Rankin, Hill & Clark LLP

(57) ABSTRACT

A front and rear integrated vehicle HVAC system includes a front HVAC portion with a front blower and a front vent outlet, and a rear HVAC portion with a rear blower and a rear vent outlet. The system includes a controller that determines a minimum voltage to be supplied to the rear blower to prevent an inverse air flow from being expelled from the rear outlet and/or a rear blower air intake. A voltage supplied to the rear blower is then set as the greater of the minimum rear blower voltage and a current rear blower voltage. The inverse air flow is air flow in the front HVAC portion generated by the front blower and intended for the front vent outlet that seeps into the rear HVAC portion and is expelled from the rear vent outlet and/or the rear blower air intake.

14 Claims, 4 Drawing Sheets

(56) References Cited

U.S. PATENT DOCUMENTS

| | | |
|---|---|---|
| 2007/0084938 A1* | 4/2007 | Liu .......................... 236/91 D |
| 2010/0248604 A1 | 9/2010 | Kanemaru et al. |
| 2010/0304654 A1 | 12/2010 | Kakizaki et al. |
| 2011/0005734 A1 | 1/2011 | Nanaumi et al. |

OTHER PUBLICATIONS

Extended European Search Report of EP Serial No. 12747129.0 dated Sep. 1, 2014, 5 pages.

* cited by examiner

METHOD AND APPARATUS FOR OPERATING A VEHICLE HVAC SYSTEM TO PREVENT OUTPUT OF INVERSE AIRFLOW

BACKGROUND

The present disclosure is directed to a method and apparatus for controlling a vehicle HVAC system, and more particularly to a method and apparatus for controlling a front and rear integrated vehicle HVAC system so as to prevent an inverse air flow from being output from an undesired vent outlet and/or blower intake.

To improve the operation of vehicle heating, ventilation and air conditioning (HVAC) systems, independent climate control region functionality has been developed and implemented. Vehicle cabins may generally be conceptually divided into a front region and a rear region, and further divided into a driver's side region and a passenger's side region. As used herein, the front region corresponds to an area where a driver and front passenger seat are located, and the rear region corresponds to a vehicle cabin area where rear seats are provided. According to the independent climate control functionality, custom climate control can be provided for passengers seated in any of the plurality of vehicle cabin regions.

To efficiently control climate throughout both the front and rear regions of the vehicle cabin, a front and rear integrated HVAC system may be employed. Such a system may utilize one or more blower units associated with each vehicle cabin region generating a climate controlling air flow to be expelled through one or more vent outlets or ducts into the corresponding vehicle cabin region. Additionally, the front and rear integrated HVAC system may employ other climate controlling mechanisms or components for the front and rear portions of the vehicle, such as evaporators, heater cores, etc. Furthermore, custom controls for each of the various regions within a vehicle cabin are provided such that climate control for each of the regions can be particularly adjusted to suit the comfort of passengers disposed in those regions.

Though such custom controls have been developed to allow for customized climate control in each of the various vehicle cabin regions, and each of the regions may have dedicated HVAC components, the HVAC system remains a single, integrated system. As such, especially in situations where one blower is operating at a relatively higher rate than others (e.g. has a higher voltage applied thereto than another blower), pressure differentials within the integrated HVAC system may exist. Such pressure differentials may result in an inadvertent redirecting of air flow, as vacuum attraction toward lower pressure regions within the HVAC system may not agree with the intended air flow path. This may result in air flow originating from a blower associated with a particular vehicle cabin region being expelled through a vent outlet associated with a different vehicle cabin region and/or an air intake of another blower.

This problem may be further exacerbated by the fact that the air flow being expelled from the unintended vent outlet may not be climate controlled in the manner desired by the passengers in the subject region, or at all. For example, if the HVAC system is operating in a heating mode, it is possible that unheated air flow may be passing through an unintended vent outlet, thereby expelling cold air into a vehicle cabin region where heated air is desired. This degrades the operation of the customizable climate control for the various vehicle cabin regions.

SUMMARY

According to one aspect, a method for operating a front and rear integrated vehicle HVAC system having a front HVAC portion with a front blower and a front vent outlet, and a rear HVAC portion with a rear blower and a rear vent outlet includes determining a minimum voltage to be supplied to the rear blower to prevent an inverse air flow from being expelled from the rear outlet. Once the minimum rear blower voltage required to prevent the inverse air flow from being expelled from the rear outlet is determined, a voltage supplied to the rear blower is set as the greater of the minimum rear blower voltage and a current rear blower voltage. The inverse air flow is air flow in the front HVAC portion generated by the front blower and intended for the front vent outlet that seeps into the rear HVAC portion and is expelled from the rear vent outlet.

According to another aspect, a method for operating a front and rear integrated vehicle HVAC system having a front HVAC portion with a front blower and a front vent outlet, and a rear HVAC portion with a rear blower and a rear vent outlet includes determining a minimum voltage to be supplied to the rear blower to counteract an inverse air flow being expelled from the rear outlet. Once the minimum rear blower voltage required to counteract the inverse air flow being expelled from the rear outlet is determined, a voltage supplied to the rear blower is set as the greater of the minimum rear blower voltage and a current rear blower voltage. The inverse air flow is air flow in the front HVAC portion generated by the front blower and intended for the front vent outlet that seeps into the rear HVAC portion and is expelled from the rear vent outlet.

According to still another aspect, a controller for a front and rear integrated vehicle HVAC system includes a voltage controller configured to control a voltage supply to the rear blower. The voltage controller is configured to determine a minimum rear blower voltage required to prevent an inverse air flow from being expelled from a rear outlet. The minimum rear blower voltage is determined based on an operational condition of a front blower. Additionally, the voltage controller is configured to control the voltage supplied to the rear blower to be the minimum of the rear blower voltage if a current rear blower voltage is less than the minimum rear blower voltage.

According to yet another aspect, a front and rear integrated vehicle HVAC system includes a front HVAC portion having a front blower and a rear HVAC portion in communication with the front HVAC portion and having a rear blower. The system additionally includes a voltage controller configured to control voltage supply to the rear blower. The voltage controller is further configured to determine the minimum blower voltage required to prevent an inverse air flow from being expelled from a rear outlet based on an operational condition on the front blower. Additionally, the voltage controller controls the voltage supplied to the rear blower to be the minimum real blower voltage if a current rear blower voltage is less than the minimum rear blower voltage.

DETAILED DESCRIPTION

A method and apparatus for controlling a front and rear integrated vehicle HVAC system will be described herein with reference to the appended figures. The description with reference to the figures is made to exemplify the disclosed method and apparatus and is not intended to limit the method and apparatus to the representations made in the figures. Specifically, description with reference to the figures is intended only to simplify and facilitate the understanding of the subject method and apparatus for persons of ordinary skill in the art. Said description with reference to the figures is not to be interpreted as limiting the scope of the method and apparatus.

Figure 1:
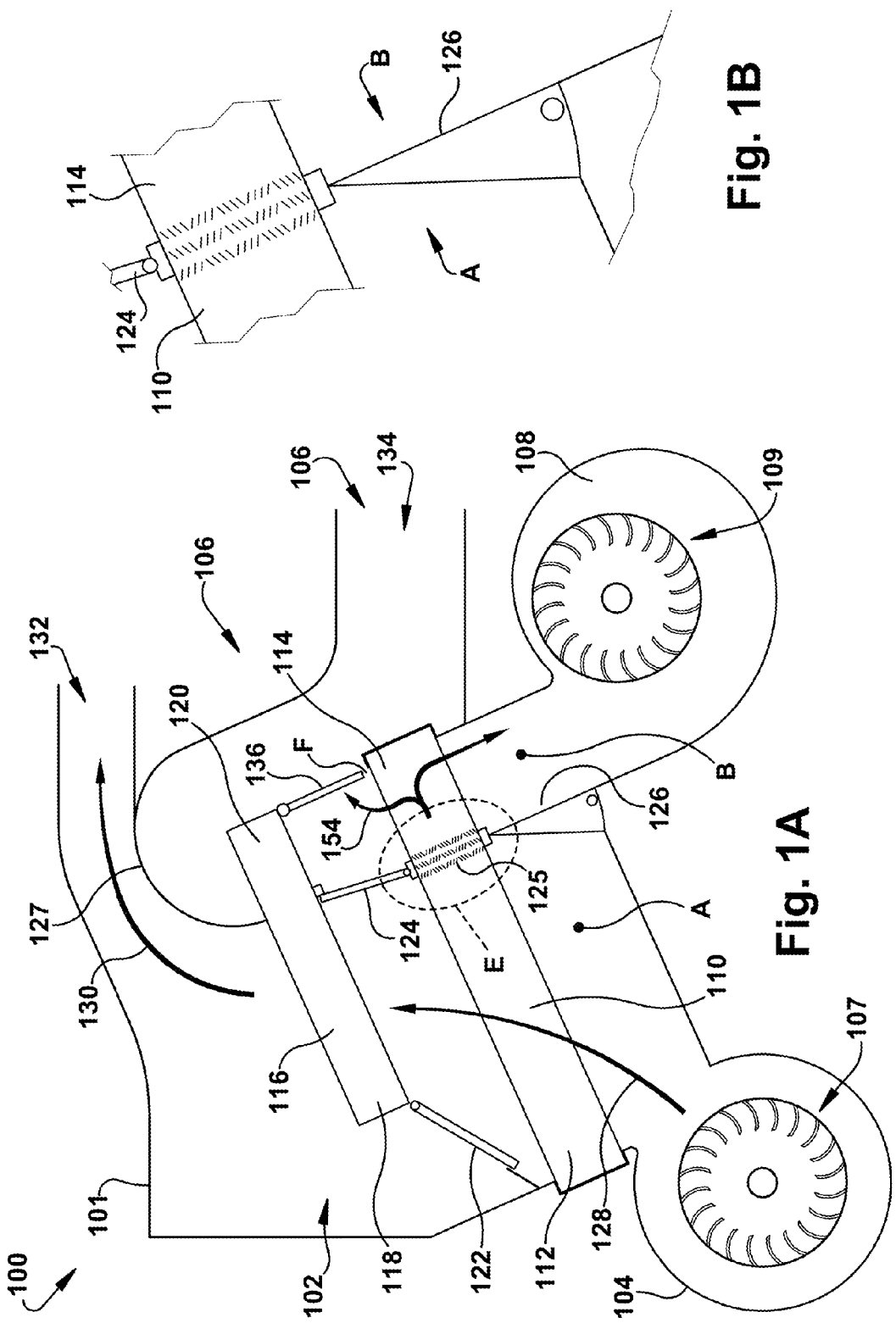
FIG. 1A is a side schematic view illustrating an integrated vehicle HVAC system.
FIG. 1B is a side schematic view illustrating an area "E" of the HVAC system from FIG. 1A.

FIG. 1A illustrates a front and rear integrated vehicle HVAC system 100 (hereinafter, "HVAC system 100"). In one embodiment, as is known and understood by those skilled in the art, the HVAC system 100 is capable of providing custom climate controlled air to front and rear regions of a vehicle cabin. At least one user interface (not shown) can be provided in the vehicle cabin to allow passengers to set custom operation instructions for the HVAC system 100 to separately control a climate in the front and rear vehicle cabin regions. It is to be appreciated that the HVAC system 100 may also be capable of providing custom climate control to driver and passenger sides of the vehicle cabin in both the front and rear vehicle cabin regions, as well as to a third row and/or a cargo area of the vehicle. To simplify explanation of the described method and apparatus, the description herein is limited to an HVAC system operable to separately control the climate in the front and rear vehicle cabin regions. However, it is to be appreciated that the method and apparatus for controlling operation of the HVAC system 100 is amenable for use with additional vehicle cabin regions.

As shown in FIG. 1A, the HVAC system 100 has a casing 101 defining a first or front HVAC portion 102 providing a generally isolated communication channel between a first or front blower 104 and a first or front vent outlet 132, and a second or rear HVAC portion 106 providing a generally isolated communication channel between a second or rear blower 108 and a second or rear vent outlet 134. The front and rear blowers 104, 108 are independently operable according to operational instructions set by the passengers at the user interface for each of the front and rear vehicle cabin regions. The front and rear blowers 104, 108 are respectively provided with front and rear blower air intakes 107, 109.

An evaporator 110 is provided in the HVAC casing 101 so as to longitudinally extend across the casing 101 such that a first or front evaporator portion 112 is disposed in the front HVAC portion 102 adjacent to the front blower 104, and a second or rear evaporator portion 114 is disposed in the rear HVAC portion 104 adjacent to the rear blower 108. The evaporator 110 is provided to remove humidity from and cool an air flow passing therethrough. Further, a heater core 116 is provided downstream from the evaporator 110 in a direction of airflow from the front and rear blowers 104, 108. As with the evaporator 110, the heater core 116 extends in a longitudinal direction of the casing 101 so as to have a first or front portion 118 disposed in the front HVAC portion 102 and a second or rear portion 120 disposed in the rear HVAC portion 106. The heater core 116 is provided to heat air flow passing therethrough. The structures of the evaporator 110 and heater core 116 are generally known in the art, and will therefore not be described in detail herein.

The evaporator front portion 112 and heater core front portion 118 are disposed to provide climate control for air flow originating from the front blower 104. To ensure the front portions of the evaporator 112 and heater core 118 interact with and provide climate control for air flow originating from the front blower 104, the HVAC casing 101 is configured to define a generally isolated air flow channel between the front blower 104 and the front vent outlet 132. The evaporator front portion 112 and the heater core front portion 118 are provided in the front HVAC portion 102 such that the air flow from the front blower 104 is forced to pass through the evaporator front portion 112, and is forced to pass through and be heated by the heater core front portion 118 when the HVAC system 100 is in a heat mode for the front vehicle cabin region.

Similarly, the evaporator rear portion 114 and the heater core rear portion 120 are designated to provide climate control for air flow originating from the rear blower 108. To ensure that the rear portions of the evaporator 114 and heater core 120 interact with and provide climate control for air flow originating from the rear blower 108, the HVAC casing is configured to define a generally isolated air flow channel between the rear blower 108 and the rear vent outlet 134. The evaporator rear portion 114 and the heater core rear portion 120 are provided in the rear HVAC portion 104 such that air flow from the rear blower 108 is forced to pass through the evaporator rear portion 114, and is forced to pass through and be heated by the heater core rear portion 120 when the HVAC system 100 is in a heat mode for the rear vehicle cabin region.

As configured, air flow from the front blower 104 follows an air flow path (indicated by arrows 128 and 130) through the evaporator front portion 112 and the heater core front portion 118 to pass through the front vent outlet 132. Similarly, air flow originating from the rear blower 108 passes through the evaporator rear portion 114 and the heater core rear portion 120 so as to be expelled through the rear vent outlet 134. The HVAC system 100 may include additional features for the control of air flow, such as rotatable doors 122, 136. The HVAC system 100 also allows for heating to be selectively activated or deactivated based on user-set instructions at the user interface. The activation and deactivation can be achieved through the selective positioning of the rotatable doors 122, 124, 136 and/or by turning the heater core 116 on or off. Herein, the front HVAC portion 102 is described as being operated in a heat mode.

To allow for custom climate control in each of the front and rear vehicle cabin regions, the casing 101 separates the front and rear HVAC portions 102, 106 such that the climate controlling airflow to be expelled from the front vent outlet 132 does not mix with the climate controlling airflow to be expelled from the rear vent outlet 134. The casing 101 separates the front and rear HVAC portions 102, 106 through the provision of a barrier between the front HVAC portion 102 and the rear HVAC portion 106. The barrier is formed of a lower wall portion 126 extending from a lower end of the casing 101 to a lower surface of the evaporator 110, a wall 124 which extends from an upper surface of the evaporator 110 to a lower surface of the heater core 116, and a bend portion 127 which extends from an upper surface of the heater core 116 to the respective front and rear vent outlets 132, 134. This configuration relies upon the evaporator 110 and the heater core 116 to serve as barriers in certain areas, such as an area E (expanded in FIG. 1B) where the evaporator 110 serves as a barrier in the vicinity of evaporator barrier 125 disposed between an upper end of the lower wall portion 126 and a lower end of the wall 124.

Generally, in one embodiment, the evaporator 114 is formed of a series of tubes, through which a coolant passes, and fins. As such, though illustrated as a solid rectangle, the evaporator 114 can be configured to have several hollow spaces. Accordingly, the barrier formed by the evaporator 110 does not fully separate or partition the front and rear HVAC portions 102, 106. The hollow spaces of the evaporator 110 may allow air flow to pass between the front and rear HVAC portions 102, 106 in the vicinity of the evaporator barrier 125.

In certain situations, such as when a pressure differential between the front and rear HVAC portions 102, 106 is great, the passage of air flow from one of the HVAC portions to the other may occur beyond what is desired (e.g., at more than a desired rate or in a reverse direction from what is desired). Specifically, when an air flow velocity generated by one of the blowers 104, 108 is sufficiently greater than that generated by the other, a pressure differential between the front HVAC portion 102 and rear HVAC portion 106 may result. As a result of the pressure differential, an air flow in the high pressure region may be attracted to the low pressure region. This effect may cause or increase passage of an inverse air flow between the front and rear HVAC portions 102, 106 through the hollow spaces in the evaporator 114. The inverse air flow may then be expelled from an undesired vent outlet 132, 134 and/or from the one of the air intakes 107, 109.

As an example, if a voltage supplied to the front blower 104 is greater than that supplied to the rear blower 108, the front blower 104 will generate air flow at a higher velocity than the rear blower 106. The higher velocity air flow will yield a higher pressure at point A disposed in the front HVAC portion 102 than at point B disposed in the rear HVAC portion 106. The air flow in the high pressure front HVAC portion 102 will be attracted to the low pressure rear HVAC portion 106, and some of the air flow generated by the front blower 104 will seep through the hollow spaces in the evaporator 110 and enter the rear HVAC portion 106 as inverse air flow. Specifically, as shown by arrow 154 in FIG. 1A, the inverse air flow may pass through the evaporator barrier 125 from the evaporator front portion 112 to the evaporator rear portion 114 and into the rear HVAC portion 106. Once in the rear HVAC portion 106, the inverse air flow may be expelled from the rear vent outlet 134 and/or the rear air intake 109 and into the rear vehicle cabin region.

The passage of inverse air flow from the front HVAC portion 102 to the rear HVAC portion 106 through the evaporator 110 may reduce the efficiency or quality of climate control according to user-set instructions throughout the cabin. This is especially so when the HVAC system 100 is operating in a heating mode. When operating in the heating mode, the inverse air flow 154 passing from the front HVAC portion 102 to the rear HVAC portion 106 is unheated air (e.g., inverse airflow is at ambient temperature, and is generally air flow which has not passed through the heater core 116) that is eventually expelled through the rear vent outlet 134 and/or the rear air intake 109. As such, the rear vehicle cabin region may have cool and/or unheated air expelled there into, thereby reducing the climate controlling ability of the HVAC system 100 with respect to the rear region of the vehicle cabin.

As used herein, the term inverse air flow references an air flow originating from one of the blowers 104, 108 intended for the respective and/or associated vent outlet 132, 134 that inadvertently or undesirably enters the adjoining HVAC portion 102, 106. In view of the above, the inverse air flow may seep through the tubes and fins of the evaporator 110 at the evaporator barrier 125, though other unsealed openings between the front and rear HVAC portions 102, 106 may allow passage or seepage of inverse air flow between the front and rear HVAC portions 102, 106. The description of the control method and apparatus herein will focus on air flow seeping from the front HVAC portion 102 to the rear HVAC portion 106 through the evaporator 110. However, inverse air flow may seep in the other direction and into the front HVAC portion 102, or may seep in either direction through any other unsealed area separating the front and rear HVAC portions 102, 106.

Figure 2:
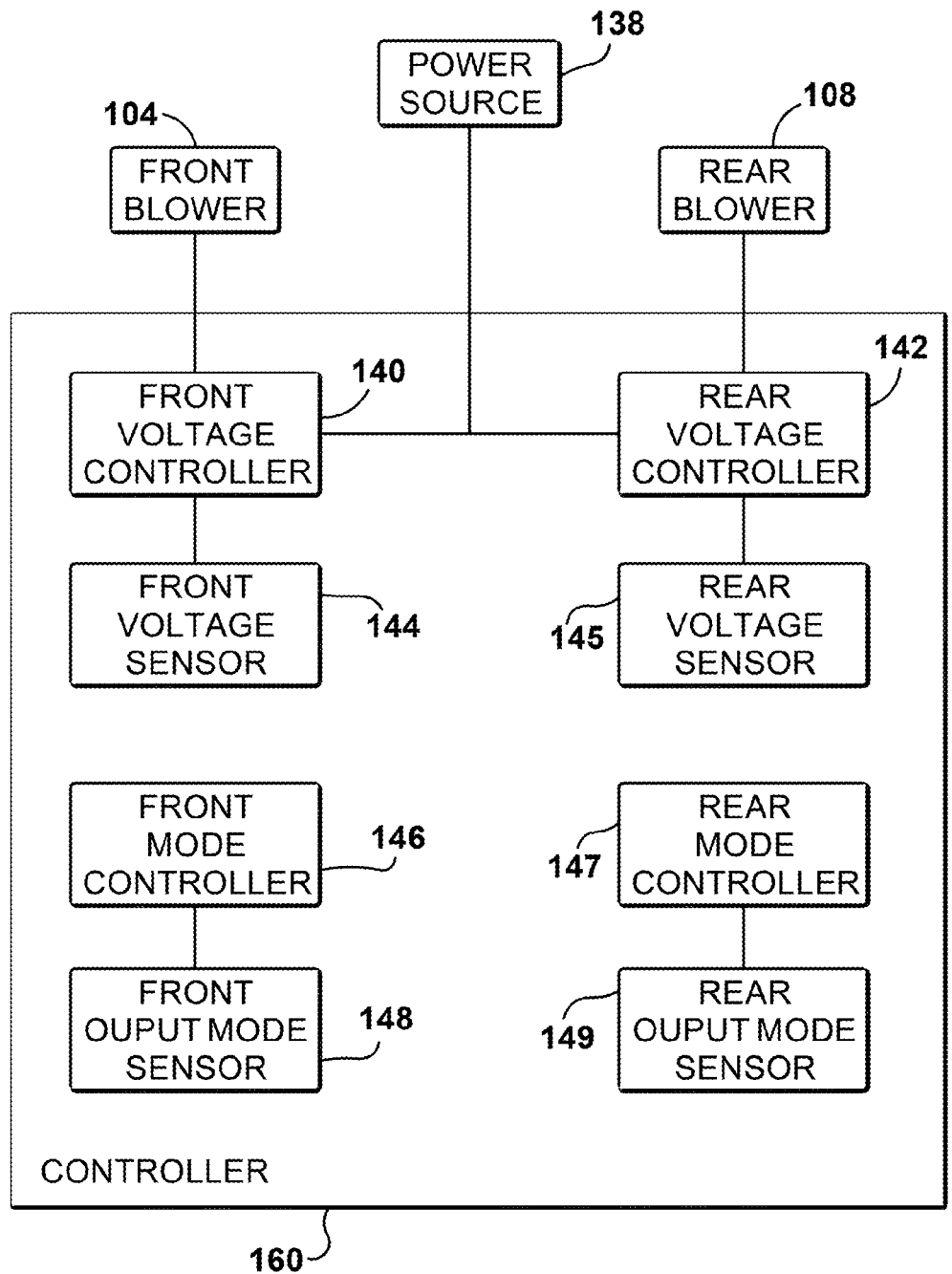
FIG. 2 is a schematic block diagram illustration of the front and rear integrated HVAC system.

FIG. 2 illustrates operational components of a controller 160 for the HVAC system 100. The controller 160 is connected to a power source 138 that supplies voltage to the front blower 104 and rear blower 108 through a front voltage controller 140 and a rear voltage controller 142. The front and rear voltage controllers 142 incorporate, or are at least connected to, front and rear voltage sensors 144, 145, respectively. The controller 160 also includes front and rear mode controllers 146, 147 which incorporate, or are at least connected to, front and rear output mode sensors 148, 149.

The controller 160 may take the form of any processing unit, such as a computer processing unit. Further, the controller 160 may be a single processing unit, or may take the form of multiple processing units. The above described components or elements included in the controller 160 may be incorporated into the controller 160 processing unit(s), or may be provided separate from the controller 160.

The power source 138 may be any source of voltage found in the vehicle in which the HVAC system 100 is employed. For example, the power source 138 may be the vehicle battery or may be tied to the engine through a belt system. Insofar as other energy or power sources may be provided in the vehicle, such sources may, alone or in combination with others, comprise the power source.

The front and rear voltage controllers 140, 142 are provided to regulate or control a voltage supplied to the corresponding front and rear blower 104, 108, and as such may take the form of any device capable of regulating or controlling the transmission of voltage between the power source 138 and the subject electrical components, herein the front and rear blowers 104, 108. The front and rear voltage controllers 140, 142 are connected to and receive instructions from the user interface in the vehicle cabin. Specifically, the front voltage controller 140 receives instructions related to the operation of the front blower 104 with respect to a climate controlling air flow velocity, and the rear voltage controller 142 receives instructions related to the operation of the rear blower 108 with respect to a climate controlling air flow velocity.

The front and rear voltage sensors 144, 145 may take the form of any devices capable of measuring or sensing a voltage being supplied to the respective front and rear blowers 104, 108 from the power source 138 through the respective front and rear voltage controllers 140, 142. Particularly, the front and rear voltage sensors 144, 145 may be configured to detect or sense a voltage supply setting at the respective front and rear voltage controller 140, 142. Alternatively, the supplied voltage may be directly measured by the front and rear voltage sensors 144, 145 by connecting the voltage sensors 144, 145 between the voltage controllers 140, 142 and their respective blower 104, 108. The front and rear voltage sensors 144, 145 supply a sensed voltage signal to the controller 160 for processing, as discussed in further detail below.

The front and rear mode controllers 146, 147 are provided to control an output mode of the front and rear HVAC portions 102, 106 in accordance with instructions supplied at the user interface. The mode controllers 146, 147 are connected to the user interface, and may take the form of any device capable of receiving instructions from the user interface and translating those instructions into adjustment and/or movement of the rotatable doors 122, 136 within the casing 101 and to turn on or off the heater core 116. Specifically, the front mode controller 146 receives instructions from the user interface with respect to operation of the front HVAC portion 102 and the rear mode controller 147 receives instructions from the user interface with respect to operation of the rear HVAC portion 106. The mode controllers 146, 147 cooperate with the controller 160 to adjust the rotatable doors 122, 136 within the casing 101, as well as other rotatable doors controlling which of a plurality of vent outlets the climate controlling air is to be expelled from, and to either turn on or off the heater core 116 depending on whether the HVAC system 100 is set to a heat mode at the user interface.

The front and rear output mode sensors 148, 149 monitor an output mode of the front and rear HVAC portions 102, 106 and may take the form of any devices capable of sensing an output mode for the respective HVAC portions 102, 106. Particularly, the output mode sensors 148, 149 may be configured to detect or sense an output mode setting from the user interface or the respective mode controller 146, 147. Alternatively, the output mode may be directly sensed through monitoring of the front and rear HVAC portions 102, 106, specifically by sensing a position of all rotatable doors and an on/off status of the heater core 116.

With respect to the prevention of expulsion of inverse airflow from a vent outlet or an air intake, the controller 160 operates to regulate a pressure differential between the front HVAC portion (e.g., point A) and the rear HVAC portion (e.g., point B). By regulating the pressure differential, inverse air flow is less likely to seep through the evaporator barrier 125 between the front and rear HVAC portions 102, 106. Additionally and/or alternatively, the controller 160 can operate to direct a climate controlled air through the front or rear HVAC portion 102, 106 affected by the inverse air flow (e.g., the HVAC portion 102, 106 with the lower relative pressure) such that the climate controlled air flow mixes with the inverse air flow to regulate the temperature of the air flow expelled from the vent outlet 132, 134.

Figure 3:
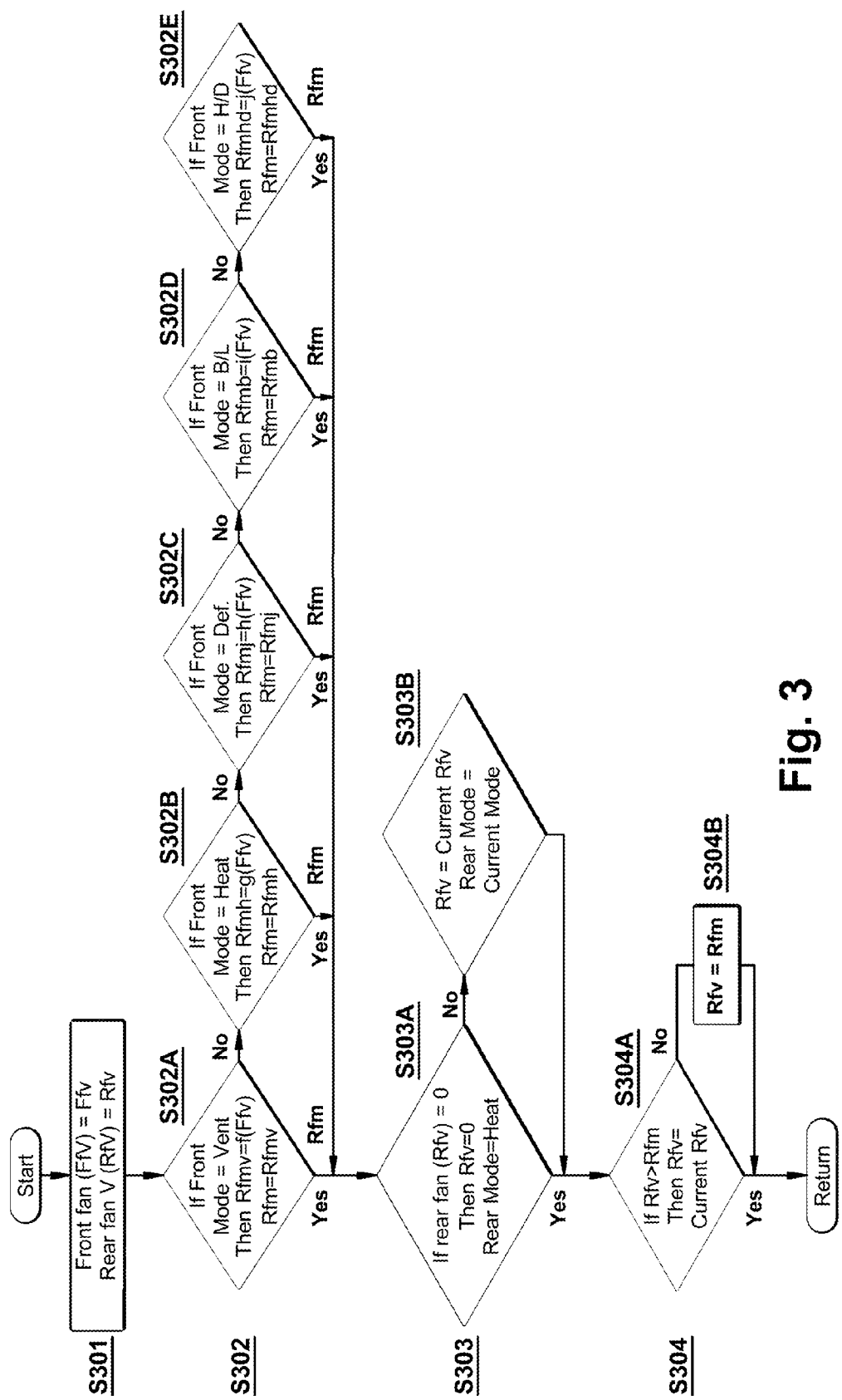
FIG. 3 is a flow chart showing a method for operating of the integrated front and rear HVAC system.

A method for operation of the HVAC system 100 using the controller 160 to prevent the expulsion of inverse air flow into the vehicle cabin (or to reduce the effect of the expulsion of the inverse air flow) is shown in FIG. 3. At S301, the front voltage sensor 144 senses a voltage being supplied to the front blower 104 and the rear voltage sensor 145 senses a voltage being supplied to the rear blower 108. The voltage supplied to the front blower 104 is denoted Ffv and the voltage supplied to the rear blower 108 is denoted Rfv. It is to be appreciated that an air flow velocity from the blowers 104, 108 is proportional to the voltage supplied thereto.

The method then senses or determines the output or operation mode of the front HVAC portion 102 and sets a minimum rear blower voltage Rfm (e.g., a minimum voltage to be supplied to the rear blower 108 to prevent inverse air flow expulsion from the rear vent outlet 134 and/or rear air intake 109) based on the output mode of the front HVAC portion 102 and the front blower voltage Ffv at S302. The output mode of the front HVAC portion 102 is sensed by the front output mode sensor 148 and communicated to the controller 160 for processing. The controller 160 calculates a minimum rear blower voltage Rfm based on the sensed front blower voltage Ffv (from S301) as a function of the output mode of the front HVAC portion 102 (from S302).

It is noted that the minimum rear blower voltage Rfm varies as a function of both the front blower voltage Ffv and the output mode of the front HVAC portion 102 because both contribute to the pressure differential between the front HVAC portion 102 (point A) and the rear HVAC portion 106 (point B). This is because the output mode of the front HVAC portion 102, which relates to the direction of air flow within the front HVAC portion 102, may affect the pressure therein. As such, the minimum rear blower voltage Rfm is determined according to different functions depending on the output mode of the front HVAC portion 102. Specifically, when the output mode of the front HVAC portion 102 is: VENT, then Rfm=Rfmv=f(Ffv) (S302A); HEAT, then Rfm=Rfmh=g(Ffv) (S302B); DEFROST (DEF), then Rfm=Rfmd=h(Ffv) (S302C); BLOWER/LEG (B/L), then Rfm=Rfmb=i(Ffv) (S302D); and HEAT/DEFROST (H/D), then Rfm=Rfmhd=j(Ffv) (S302E). The preceding is an exemplary list of output modes. If the HVAC system 100 allows for other output modes, then additional functions for determining the minimum rear blower voltage Rfm are to be used.

Figure 4:
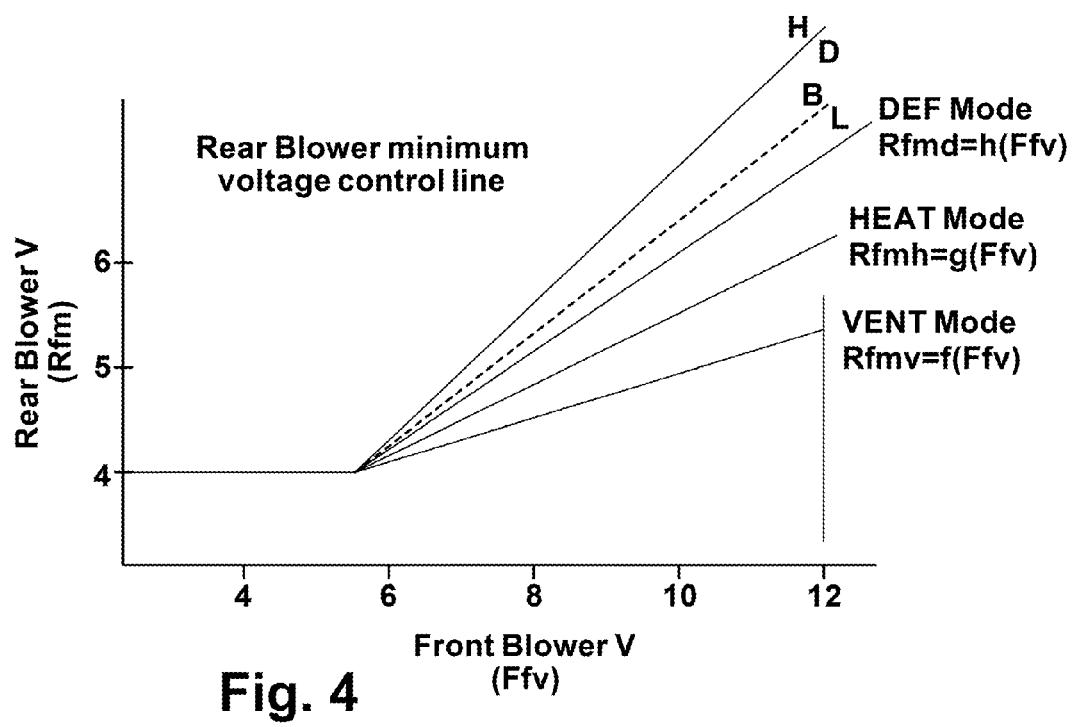
FIG. 4 is a graph representing a minimum rear voltage determination curve.

With respect to the above minimum rear blower voltage Rfm determining functions, an exemplary graph illustrating a curve of the minimum rear blower voltage Rfm as a function of a current front blower voltage Ffv for each of the above output modes is shown in FIG. 4. Therein, a rear blower minimum voltage control line for each of the above-listed output modes is shown. With respect to calculating or determining the minimum rear blower voltage Rfm, a value can be retrieved from the graph if a front blower voltage Ffv and front output mode are known. As such, the controller 160 may include a reference look-up table containing values associated with the curve illustrated in FIG. 4. For example, the reference look-up table would have a minimum rear blower voltage Rfm value of 5V for a front blower voltage Ffv of 7V in the B/L output mode. Alternatively, each of the curves illustrated in FIG. 4 can be reduced to equation form, and the controller 160 can select the appropriate equation based on the sensed output mode of the front HVAC portion 102 to calculate the minimum rear blower voltage Rfm required to prevent expulsion of inverse air flow.

Once the minimum rear blower voltage Rfm is determined at S302, the method continues to set an output mode for the rear HVAC portion 106 based on the sensed rear blower voltage Rfv and the user-instructed output mode of the rear HVAC portion 106, as sensed by the rear output mode sensor 149, at S303. If the rear HVAC portion 106 is set to be OFF, wherein the rear blower voltage Rfv=0, the output mode for the rear HVAC portion 106 is set to the "Heat" mode at S303A. If the rear HVAC portion 106 is ON, wherein the rear blower voltage Rfv >0, then the output mode for the rear HVAC portion 106 is maintained at a current user-set output mode at S303B.

The rear blower voltage Rfv (as sensed at S301) is then compared with the minimum rear blower voltage Rfm (as determined at S302) at S304. If the rear blower voltage Rfv is greater than the minimum rear blower voltage Rfm, then the rear blower voltage Rfv is maintained (S304A). Otherwise, the rear blower voltage Rfv is set to equal the minimum rear blower voltage Rfm by the rear voltage controller 142 (S304B).

By ensuring that the rear blower 108 is receiving at least the minimum rear blower voltage Rfm, a minimum air flow velocity from the rear blower 108 is maintained so as to reduce the pressure differential between the front and rear HVAC portions 102, 106, thereby reducing the attractive force drawing the air flow in the front HVAC portion 102 to the rear HVAC portion 106. Alternatively, the minimum rear blower voltage Rfm may be a voltage required to generate a sufficient climate controlled air flow to counteract the effects of the inverse air flow being expelled through the rear vent outlet 134 and/or the rear air intake 109.

In summary, the above-described method controls operation of the HVAC system 100 so as to prevent an inverse air flow from seeping from the front HVAC portion 102 to the rear HVAC portion 106 and being expelled through the rear vent outlet 134 and/or the rear air intake 109. In its most basic form, the method includes determining a minimum rear blower voltage Rfm required to prevent inverse air flow from being expelled from the rear vent outlet 134 and/or the rear air intake 109, and setting a voltage supplied to the rear blower 108 using the rear voltage controller 142 to be the greater of the minimum rear blower voltage Rfm and the current rear blower voltage Rfv. As mentioned above, the minimum rear blower voltage Rfm may be determined as a voltage required to maintain a sufficient air flow velocity from the rear blower 108 to reduce the pressure differential between the front HVAC portion 102 (at point A) and the rear HVAC portion 106 (at point B). In other words, the rear blower 108 is operated so as to maintain a pressure differential between the front HVAC portion 102 and the rear HVAC portion 106 to remain below a predetermined pressure differential value. The predetermined pressure differential value is the pressure differential at which the risk of inverse air flow is deemed unacceptable.

The pressure differential between the front and rear HVAC portions 102, 106 (points A and B) should be reduced to remain below or within a predetermined level or range wherein seepage of inverse air flow from the front HVAC portion 102 to the rear HVAC portion through the evaporator 110 is minimized or eliminated. The precise level or range of pressure differentials can be mathematically or experimentally determined. Similarly, if the method is applied to supply a climate controlled air flow to mix with the inverse air flow (which is not climate controlled), the quantity and temperature of the climate controlled air required to counteract the effects of the inverse air flow may be experimentally or mathematically determined.

The control method and apparatus for the HVAC system 100 described herein operates to prevent inverse air flow originating from the front blower 104 from being expelled through the rear vent outlet 134 and/or the rear air intake 109. However, as discussed above, the control method and apparatus can also be provided to prevent an inverse air flow originating from the rear blower 108 from seeping into the front HVAC portion 102 and passing through the front vent outlet 132 and/or the front air intake 107. Additionally, the control method and apparatus is amenable for preventing an inverse air flow from seeping between generally separated driver and passenger HVAC portions in an HVAC system providing custom climate control between a driver and passenger side of the vehicle cabin.

Additionally, the control method and apparatus are described above with respect to a front HVAC portion 102 operating in a Heat mode, wherein the inverse air flow seeping into the rear HVAC portion 106 is unheated. However, the control method and apparatus are similarly operable to prevent or reduce inverse air flow that has not been air-conditioned from passing from one HVAC portion 102, 106 to the other. Such control would operate in a similar manner as that described above, and may be modified with an additional function provided for Air Condition (A/C) operation in S302, and also be modified allow the rear output mode to be set to Heat mode if OFF in S303A.

Furthermore, the control method and apparatus can be simplified to set the minimum rear blower voltage Rfm based on only the front blower voltage Ffv, without regard for the output mode of the front HVAC portion 102. Alternatively, the minimum rear blower voltage Rfm may be set based only on the output mode of the front HVAC portion 102.

It will be appreciated that several of the above-disclosed and other features and functions are alternatives or varieties thereof may be desirably combined into many other systems or applications. Also, that various presently unforeseen or unanticipated alternatives, modifications, variations or improvements therein may be subsequently made by those skilled in the art which are also intended to be encompassed by the following claims.

What is claimed is:

1. A method for operating a front and rear integrated vehicle HVAC system having a front HVAC portion with a front blower, and a front vent outlet, and a rear HVAC portion with a rear blower having a rear blower air intake, and a rear vent outlet, comprising:
   determining a minimum rear blower voltage to be supplied to the rear blower to prevent an inverse air flow from being expelled from either of the rear vent outlet and the rear blower air intake; and
   setting a voltage supplied to the rear blower as the greater of the minimum rear blower voltage and a current rear blower voltage,
   wherein inverse air flow is air flow in the front HVAC portion generated by the front blower and intended for the front vent outlet that seeps into the rear HVAC portion and is expelled from at least one of the rear vent outlet and the rear blower air intake,
   wherein determining the minimum rear blower voltage further comprises:
   sensing a voltage supplied to the front blower;
   detecting an output mode for air flow generated by the front blower; and
   calculating the minimum rear blower voltage as a function of both the voltage supplied to the front blower and the front blower output mode.

2. The method according to claim 1, wherein the minimum rear blower voltage is determined as a voltage required to operate the rear blower so as to reduce a pressure differential between the front HVAC portion and the rear HVAC portion to below a predetermined pressure differential value.

3. The method according to claim 1, wherein a voltage controller is provided to set the voltage supplied to the rear blower as the greater of the minimum rear blower voltage and the current rear blower voltage.

4. The method according to claim 1, further comprising:
   detecting an output mode for air flow generated by the rear blower; and
   setting the rear output mode to HEAT if the rear output mode is OFF.

5. A method for operating a front and rear integrated vehicle HVAC system having a front HVAC portion with a front blower and a front vent outlet, and a rear HVAC portion with a rear blower, having a rear blower air intake, and a rear vent outlet, comprising:

determining a minimum rear blower voltage to be supplied to the rear blower to counteract an inverse air flow being expelled from either of the rear outlet and the rear blower air intake; and setting a voltage supplied to the rear blower as the greater of the minimum rear blower voltage and a current rear blower voltage, wherein inverse air flow is air flow in the front HVAC portion generated by the front blower and intended for the front vent outlet that seeps into the rear HVAC portion and is expelled from at least one of the rear vent outlet and the rear blower air intake, wherein the minimum rear blower voltage is determined as a voltage required to operate the rear blower so as to generate a sufficient amount of climate controlled air flow to mix with the inverse air flow such that a temperature of a mixture of the inverse air flow and the air flow generated by the rear blower is within a predetermined range.

6. The method according to claim 5, wherein a voltage controller is provided to set the voltage supplied to the rear blower as the greater of the minimum rear blower voltage and the current rear blower voltage.

7. A controller for a front and rear integrated vehicle HVAC system, comprising a voltage controller configured to control a voltage supplied to a rear blower, wherein the voltage controller is configured to determine a minimum rear blower voltage required to prevent an inverse airflow from being expelled from a rear outlet and a rear blower air intake based on an output mode of air flow generated by a front blower and a voltage supplied to the front blower, and to control the voltage supplied to the rear blower to be the minimum rear blower voltage if a current rear blower voltage is less than the minimum rear blower voltage, and further comprising a rear blower output mode controller, wherein the rear blower output mode controller is configured to set a rear blower output mode to HEAT if said rear blower output mode is set to OFF, and wherein the rear blower output mode controller is configured to maintain a current user-set rear blower output mode if said rear blower output mode is set to ON.

8. The controller according to claim 7, further comprising a voltage sensor for sensing a voltage being supplied to the front blower.

9. The controller according to claim 8, further comprising a sensor for sensing the output mode of air flow generated by the front blower.

10. The controller according to claim 7, wherein the voltage controller is configured to determine the minimum rear blower voltage as a voltage required to operate the rear blower so as to reduce a pressure differential between a front HVAC portion associated with the front blower and a rear HVAC portion associated with the rear blower to below a predetermined pressure differential value.

11. A front and rear integrated vehicle HVAC system, comprising:
a front HVAC portion having a front blower;
a rear HVAC portion connected to the front HVAC portion and having a rear blower;
an evaporator having a front evaporator portion disposed in the front HVAC portion and a rear evaporator portion disposed in the rear HVAC portion; and
a voltage controller configured to control a voltage supplied to the rear blower,
wherein the voltage controller is further configured to determine a minimum rear blower voltage required to prevent an inverse airflow through the evaporator from being expelled from a rear vent outlet and a rear blower air intake based on an output mode of the front HVAC portion and a voltage being supplied to the front blower, and to control a voltage supplied to the rear blower to be the minimum rear blower voltage if a current rear blower voltage is less than the minimum rear blower voltage.

12. The HVAC system according to claim 11, further comprising a voltage sensor for sensing a voltage being supplied to the front blower, and a front HVAC portion output mode sensor for sensing a front HVAC portion output mode.

13. The HVAC system according to claim 11, wherein the voltage controller is configured to determine the minimum rear blower voltage as a voltage required to operate the rear blower so as to reduce a pressure differential between the front HVAC portion and the rear HVAC portion to below a predetermined pressure differential value.

14. The HVAC system according to claim 12, further comprising a rear HVAC portion output mode controller, wherein the rear HVAC portion output mode controller is configured to set a rear HVAC portion output mode to HEAT if said rear HVAC portion output mode is set to OFF.

* * * * *